United States Patent

[11] 3,577,121

[72] Inventors Douglas J. Wing
St. Clair Shores;
William A. Ramey, Warren, Mich.
[21] Appl. No. 875,080
[22] Filed Nov. 10, 1969
[45] Patented May 4, 1971
[73] Assignee General Motors Corporation
Detroit, Mich.

[54] BRAKE FLUID LEVEL SWITCH
6 Claims, 2 Drawing Figs.
[52] U.S. Cl....................................................... 340/59,
200/82, 200/61.19, 200/84, 340/59, 340/244,
188/1, 60/54.5
[51] Int. Cl....................................................... B60q 1/00
[50] Field of Search............................................ 200/82.3,
82, 84, 61.19, 153.14; 340/52 (C), 60, 59, 242,
244; 188/1 (A); 60/54.5, 6 (E)

[56] References Cited
UNITED STATES PATENTS
2,786,914 3/1957 Storck et al..................... 200/84
3,412,556 11/1968 Rike et al........................ 188/1(A)UX
3,448,579 6/1969 Reznicek......................... 188/1(A)UX FOREIGN PATENTS
3,398 12/1891 Great Britain................ 200/61.19
Primary Examiner—David Smith, Jr.
Attorneys—F. J. Soucek and C. R. Engle ABSTRACT: A vehicle brake master cylinder assembly of the dual reservoir type including a fluid level responsive diaphragm positioned in each of the reservoirs. Each diaphragm supports a flexible insulator member which in an acceptable fluid level position is placed between a resilient spring-biased contact member and an electrically grounded reservoir cover maintaining a signal circuit therebetween open. Should the level of fluid in a reservoir decrease to a predetermined minimum level, its resilient insulator is pulled from between one of the spring-biased contacts and the reservoir cover closing the circuit to the signalling device, thereby informing the operator of the low fluid condition. Removal of the reservoir cover and filling of the reservoir raises the diaphragm to its uppermost position, but does not again open the signal circuit until the attendant performs the positive act of placing the insulator member between the spring-biased contact and the cover.

PATENTED MAY 4 1971

3,577,121

INVENTORS
Douglas J. Wing, &
William A. Rainey

BY

C. L. Engle

ATTORNEY

BRAKE FLUID LEVEL SWITCH

It is common practice in the vehicle brake art to incorporate a switch which is actuated by a fluid level responsive member indicating a loss of fluid in the brake system. Many of these switches are positioned within master cylinder reservoirs and employ contacts associated with a floating member in the fluid. However, none of these structures require the operator or attendant to perform a specific act other than that of filling the reservoir to open the signalling circuit. It is therefore a purpose of this invention to provide a simple structure which is readily accessible so that the operator may, upon a loss of fluid, remove the reservoir cover, add the necessary amount of fluid, and perform the additional step of reinstalling the insulator member between the electrical conductors again opening the signalling circuit prior to replacing the cover. The requirement of reinstalling the insulator tends to insure determination of the cause for the low fluid level condition and correction thereof prior to reassembly of the unit. A further purpose of this invention is to keep the electrically conductive parts out of contact with the hydraulic brake fluid because the master cylinder piston is very susceptible to corrosion when a voltage gradient exists in the reservoir. Therefore, in the subject invention, the insulator member movable with the diaphragm in response to fluid level is placed on a side of the diaphragm remote from the fluid and consequently none of the electrically conductive parts are in contact with the brake fluid.

The first object of this invention is the provision of a brake fluid level switch having all of its electrically conductive components out of contact with the hydraulic brake fluid.

Another object of this invention is the provision of a simply constructed switch arrangement wherein a positive act must be completed by the attendant to reset a signal circuit after the master cylinder reservoir has been refilled.

A further object of this invention is the provision of a switch arrangement wherein an electrically conductive surface of the reservoir cover provides a ground connection in a signal circuit.

A still further object of this invention is the provision of an insulator member being attached to a fluid level responsive diaphragm and being placed between the conductive cover surface and a spring biased contact maintaining a signalling circuit open until the supply of fluid decreases to the extent that the diaphragm moves with fluid level and pulls the insulator from between the conductive members allowing the switch to close the signalling circuit.

Further objects and advantages of this invention will be apparent from the following description, reference being had to the accompanying drawings wherein a preferred embodiment of the present invention is clearly shown. In the drawings.

Figure 1:
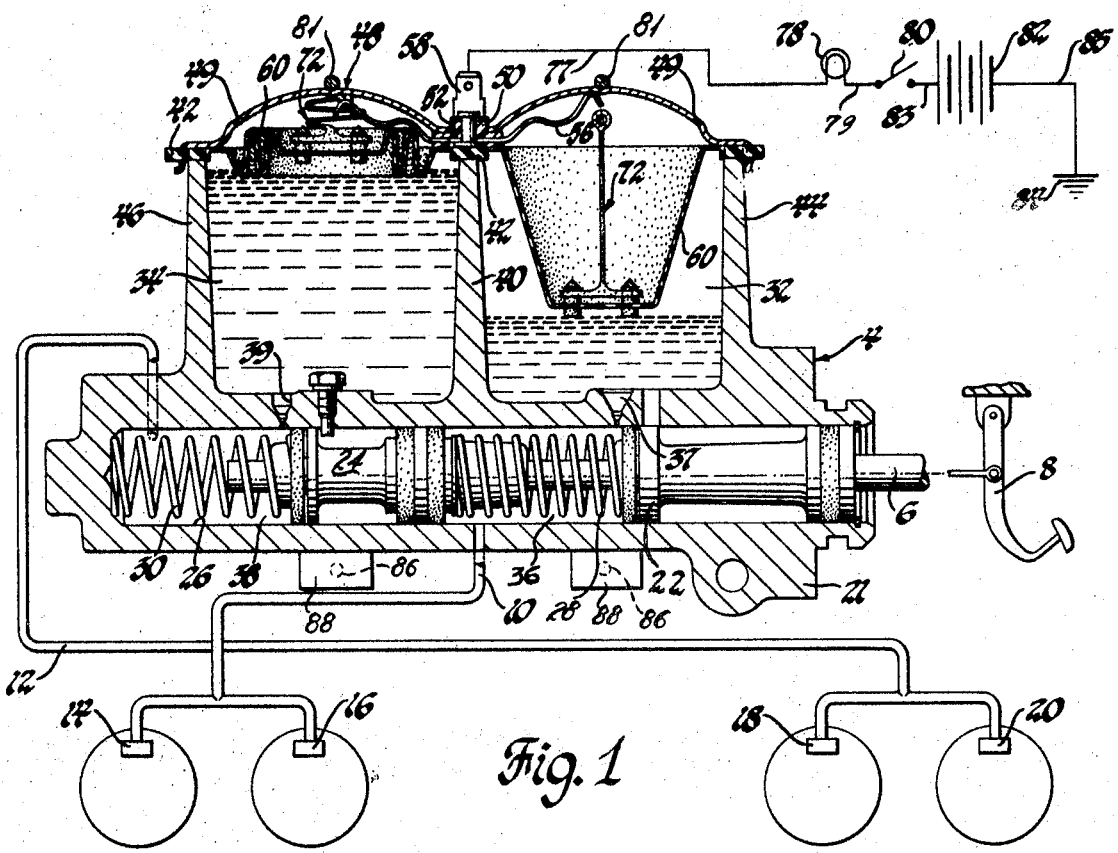
FIG. 1 is a cross-sectional side elevational view of a dual master cylinder assembly employing a switch means of the present invention, the master cylinder being connected in hydraulic circuitry with the brake assemblies at respective vehicle wheels.

Referring now to FIG. 1, a vehicle brake system is schematically shown including a master cylinder 4 being actuated by a push rod 6 from a brake pedal 8. Pressurized fluid is discharged from the master cylinder through lines 10 and 12 to respective front wheel brake assemblies 14 and 16 and rear wheel brake assemblies 18 and 20. A master cylinder body 21 contains a first piston 22 and a second piston 24 slidably disposed within cylinder 26, each piston being spring biased to a retracted position by springs 28 and 30 respectively. The master cylinder body 21 also includes reservoirs 32 and 34 which supply fluid to pressurizing chambers 36 and 38 through makeup ports 37 and 39 for pressurization and transmittal to the respective wheel brake assemblies. The reservoirs 32 and 34 are separated by web portion 40 which supports a fluid sealing gasket 42 also resting upon walls 44 and 46 defining the reservoirs 32 and 34.

Figure 2:
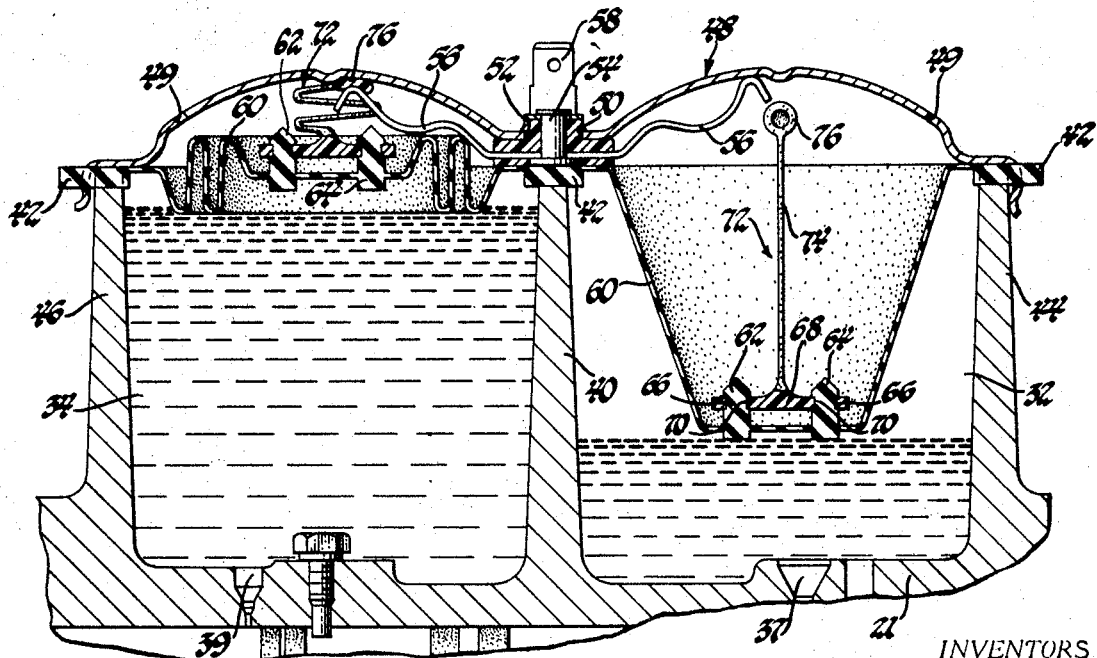
FIG. 2 is a fragmentary cross-sectional view of FIG. 1 magnified to more clearly illustrate the brake fluid level switch assembly of this invention.

A dual reservoir cap assembly 48 containing vent ports 49 supports a flanged insulator bushing 50 in a centrally disposed aperture 52 which aligns with web 40 of the master cylinder housing 21, as best illustrated in FIG. 2. An electrically conductive rivet 54 secures a resilient drawn spring wire or strip contact member 56 in the insulator bushing 52 along with securing a knife blade male electrical connector 58 to the upper surface of the bushing.

A diaphragm 60 is integral with or secured to the sealing gaskets 42 and is formed to comprise two upwardly projecting nonmetallic portions 62 and 64 in the central area of each of the reservoirs 32 and 34. The upwardly extending projections 62 and 64 are circumferentially notched at 66 to fixedly receive base member 68, containing apertures 70, of a nylon or like material insulator member 72. The insulator member includes a relatively long flexible pull line portion 74 terminating in a bulbous member 76. When the bulbous member 76 is placed between the spring conductor 56 and cover 48 it assumes a form similar to that shown in the reservoir 34 of FIG. 2.

An electrical signal circuit includes a conductor 77 attached to the blade connector 58 and signal light 78, which in turn, is connected with ignition switch 80 by a conductor 79. The switch 80 is in circuit with source 82 via conductor line 83 and the source is connected to ground at 84 by conductor 85.

The cover 48 is retained in place by bails 81 pivotally mounted in recesses 86 of lugs 88 formed integral with master cylinder body 21. The cover is in circuit to ground via bails 81 and conventional means, not shown, securing the master cylinder body 21 to the vehicle frame.

In operation, with ignition switch 80 closed and a desirable amount of fluid existing in the reservoirs, as shown in reservoir 34, the insulator 72 is positioned with bulbous portion 76 between the resilient contact member 56 and the cover 48 thereby maintaining the signalling circuit open. However, as the fluid level in the reservoirs 32 and 34 decreases the diaphragm 60 moves downwardly in response to a pressure differential resulting from a vacuum being drawn on its lower side during application of the brakes and atmospheric air entering ports 49 being subjected to the upper side of the diaphragm. Downward movement of diaphragm 60 to a predetermined minimum fluid level results in the base 68 of the insulator 72 being displaced sufficiently downward whereby the pull line 74 withdraws bulbous portion 76 from its position between the resilient contact member 56 and cover 48. The contact member 56 then engages the electrically grounded cover 48 energizing signal light 78.

When the condition exists as shown in reservoir 32 in FIG. 2, the operator will require an attendant to remove cover 48 and refill the depleted reservoir until the level approximates that shown in reservoir 34 of FIG. 2. Should the attendant replace the cover without inserting the bulbous portion 76 between the cover and the contact member 56, the signal circuit will remain energized when the ignition switch is again closed. Therefore, it is necessary for the attendant to be sure that he has filled the reservoir as well as performing the function of positively inserting the member 76 between conductor 56 and the cover 48 in order to maintain the signal circuit open when the unit is reassembled and ready for use.

From the above description, it is readily apparent that this invention provides a switch arrangement wherein it is necessary for the operator to perform a function in addition to that of merely refilling a depleted reservoir. Reinstalling the bulbous member 76 to hold the circuit open insures the determination of cause and correction of the low fluid level condition before the vehicle is again returned to the operator. The switch arrangement of this invention in this manner prevents inadvertent oversight on the part of any attendant in checking the vehicle brake system.

While the embodiment of this invention herein disclosed constitutes a preferred form, it is to be understood that other forms may be adopted.

We claim:

1. In a vehicle brake system including a master cylinder assembly containing dual reservoirs for two separate vehicle brake systems and being of the type wherein actuation of the brake pedal pressurizes fluid in a first chamber for utilization in a fist one of the systems and simultaneously pressurizes fluid in a second chamber for utilization in a second of the systems the improvement comprising: a diaphragm being mounted in each of the reservoirs, an insulator connected to said diaphragm and moving with the diaphragm in response to the level of brake fluid in the respective reservoirs, an electrical switch assembly including engageable contacts, and an insulator assembly attached to said diaphragm and normally placed between said switch contacts maintaining the switch open when the brake fluid is at a satisfactory level, and being removed from between said switch contacts as said diaphragm moves with the brake fluid to a lower predetermined unsatisfactory level whereby the switch contacts close and energize a signalling circuit.

2. In a vehicle brake dual master cylinder assembly of the type having two reservoirs supplying respective fluid pressurizing pistons for separately actuating front and rear vehicle wheel braking units the improvement comprising: a cover member for enclosing both of said reservoirs, an electrical connection secured to said cover member, a diaphragm in each of said reservoirs being secured to the master cylinder assembly by said cover member, said diaphragms being moveable in response to the brake fluid present in said reservoirs, a flexible insulator member secured to each of said diaphragms, a spring biased electrical contact member secured to said electrical connection in said cover member, said resilient contact being continually biased toward engagement with said cover member, said insulator member being positioned between said resilient contact and said cover in each of said reservoirs to prevent engagement therebetween when the reservoirs contain a desired amount of brake fluid, an electrical source, and an electrically actuated indicator in circuitry with said electrical connection and said source, said electrical indicator circuit being opened when said flexible insulator is placed between said resilient contact and said cover member, said diaphragm being movable with the fluid present in said reservoirs in response to a pressure differential developed by atmospheric air on one side of said diaphragm and a vacuum being drawn on the other side during the application of the brakes, said diaphragm moving with the level of fluid to the predetermined minimum during a loss of fluid withdrawing said insulator member from between said resilient member and said cover member whereby said members engage closing the circuit to said signalling member.

3. In a vehicle brake system including a dual master cylinder assembly of the type containing two reservoirs supplying fluid to respective fluid pressurizing pistons separately actuating front and rear vehicle wheel brake units, the improvement comprising: a cover member enclosing said reservoirs and being in electrical circuit to a ground connection, a diaphragm in each of the dual reservoirs retained by said cover member, a flexible insulating member secured to each of said diaphragms, said diaphragms moving in response to the fluid present in the reservoirs, and a resilient switch contact spring biased into engagement with said cover member in each of said reservoirs, said flexible insulating member being placed between said resilient contact and the cover member preventing engagement therebetween when the reservoir contains a working supply of brake fluid, said insulating member being withdrawn by said diaphragm as it moves downwardly in said reservoir during a loss of brake fluid allowing said resilient contact to engage said cover and complete a circuit to a signalling device.

4. In a vehicle brake dual master cylinder assembly of the type having two reservoirs and respective fluid pressurizing pistons for separately actuating front and rear wheel brake assemblies, the improvement comprising: a unitary cover member for enclosing said reservoirs, a male electrical connector insulated from and secured in said cover member, a signalling device, an electrical source, circuitry connecting said source and said signalling member to said male connector, a resilient switch contact member secured to said cover member simultaneously with said male connector, said resilient switch contact spring biased into engagement with said cover member, said cover member being electrically connected to ground, a diaphragm in each of said reservoirs movable in response to the fluid level therein, and a flexible insulator member secured to each of said diaphragms and normally being positioned between said resilient contact and said cover to prevent electrical conduction therebetween when the reservoirs contain a desired amount of brake fluid, said diaphragms moving with the level of fluid in said reservoirs during a loss of fluid to withdraw said flexible insulator members from between said resilient contacts and said cover allowing engagement therebetween and completion of the electrical signalling circuit.

5. In a vehicle brake system including a master cylinder assembly containing dual reservoirs for two separate vehicle brake systems and being of the type wherein actuation of the brake pedal pressurizes fluid in a first chamber for utilization in a first one of the systems and simultaneously pressurizes fluid in a second chamber for utilization in a second of the systems, the improvement comprising:
   means defining a pair of resiliently engageable conducting members located in each reservoir above the normal liquid level therein;
   a removable insulating member sandwiched between the conducting members of each pair so as to insulate each in relation to the other;
   a float on the surface of the liquid in each reservoir, so as to rise and fall with the liquid level therein;
   means connecting each float device to the corresponding insulating member, effective when the liquid level in the chamber falls to a predetermined unsatisfactory value to withdraw the insulating member and free the conducting members for electrical engagement with each other, and;
   signal means responsive to the condition of electrical engagement between each pair of said conducting members.

6. In a vehicle brake system including a master cylinder assembly containing dual reservoirs for two separate vehicle brake systems and being of the type wherein actuation of the brake pedal pressurizes fluid in a first chamber for utilization in a first one of the systems and simultaneously pressurizes fluid in a second chamber for utilization in a second of the systems, the improvement comprising:
   means defining a pair of resiliently engageable conducting members located in each reservoir above the normal liquid level therein;
   a removable insulating member sandwiched between the conducting members of each pair so as to insulate each in relation to the other;
   a float on the surface of the liquid in each reservoir, so as to rise and fall with the liquid level therein;
   a stringlike flexible nonextensible connection from each float device to the corresponding insulating member, effective when the liquid level in the chamber falls to a predetermined unsatisfactory value to withdraw the insulating member and free the conducting members for electrical engagement with each other, and;
   signal means responsive to the condition of electrical engagement between each pair of said conducting members.